United States Patent [19]

Ikemoto et al.

[11] Patent Number: 4,911,588
[45] Date of Patent: Mar. 27, 1990

[54] TAPPING APPARATUS

[75] Inventors: Shigeru Ikemoto, Satsuki Jidouki Kogyo Kabushiki Kaisha, 258-banchi, Honmaeda-cho, Nakagawaku, Nagoya, Aichi; Minoru Ohta, Aichi, both of Japan

[73] Assignee: Shigeru Ikemoto, Japan

[21] Appl. No.: 216,839

[22] Filed: Jul. 8, 1988

[30] Foreign Application Priority Data

Jul. 11, 1987 [JP] Japan ................................ 62-173534
Dec. 3, 1987 [JP] Japan ................................ 62-306460
Dec. 11, 1987 [JP] Japan ................................ 62-314991

[51] Int. Cl.⁴ ........................ B23G 1/16; B23B 47/00
[52] U.S. Cl. ................................ 408/137; 10/135 R; 10/141 H; 408/138
[58] Field of Search ........................ 408/137, 138, 141; 10/105, 135 R, 135 N, 136 R, 136 E, 141 H

[56] References Cited

U.S. PATENT DOCUMENTS

| 2,796,767 | 6/1957 | Carpenter | 408/137 |
| 3,126,766 | 3/1964 | Bent | 408/137 |
| 3,640,147 | 2/1972 | Fantoni | 408/137 |
| 4,050,835 | 9/1977 | Womack | 408/137 |
| 4,115,025 | 9/1978 | Petroff | 408/137 |

FOREIGN PATENT DOCUMENTS

| 656144 | 1/1938 | Fed. Rep. of Germany | 10/136 |
| 2332623 | 1/1974 | Fed. Rep. of Germany | 408/137 |
| 290851 | 3/1971 | U.S.S.R. | 408/137 |

Primary Examiner—Daniel Howell
Attorney, Agent, or Firm—Steele, Gould & Fried

[57] ABSTRACT

A tapping apparatus in accordance with this invention includes a frame, a spindle mounted on the frame for rotation and axial movement and provided with a tap coupled to one end thereof, the spindle being driven by a driven source, an external thread section formed in the outer periphery of the spindle, a guide member rotatably mounted on the frame and having an internal thread section formed in the inner periphery thereof, the internal thread section being threadably engaged with the external thread section, and a synchronous rotation mechanism for rotatably driving the guide member in synchronization with the spindle so that the axial movement of the spindle agrees with a pitch of the tap.

6 Claims, 5 Drawing Sheets

TAPPING APPARATUS

BACKGROUND OF THE INVENTION

1. Field of the Invention

The present invention relates generally to machine tools, and more particularly to a tapping apparatus for cutting screw threads inside cavities of workpieces by power feeding a tap.

2. Description of the Prior Art

In conventional machine tools such as a machining center, a tap is attached to one end of a spindle thereof and the machine head supporting the spindle is moved toward a workpiece in synchronization with rotation of the spindle.

A rotary encoder is mounted on the spindle of the machining center in order that the head of the same is moved in synchronization with rotation of the spindle. The rotary encoder performs the arithmetic-logical operation to obtain the rotational speed of the spindle, thereby controlling movement of the machine head. Accordingly, it is mechanically difficult to have the movement of the machine head agree with a pitch of the tap. Therefore, the prior art has provided an improvement that a chuck is mounted on the spindle with a coil spring interposed therebetween so that the chuck is slightly moved in the axial direction. In case that a workpiece has a small thickness, however, the spring force acting on the chuck reduces accuracy of the screw thread. Further, in case that the machining center is not provided with a rotary encoder, it cannot be used to cut screw threads by means of a tap.

SUMMARY OF THE INVENTION

Therefore, an object of the present invention is to provide a tapping apparatus wherein screw threads are formed with high accuracy in spite of the simple construction thereof.

A tapping apparatus in accordance with this invention comprises a frame, a spindle mounted on the frame for rotation and for axial movement and provided with a tap coupled to one end thereof, the spindle being driven by a drive source, an external thread section formed in the outer periphery of the spindle, a guide member rotatably mounted on the frame and having an internal thread section formed in the inner periphery thereof, the internal thread section being threadably engaged with the external thread section, and a synchronous rotation mechanism for rotatably driving the guide member in synchronization with rotation of the spindle so that the axial movement of the spindle agrees with a pitch of the tap.

Although the tapping apparatus in accordance with the present invention thus has a simple construction and does not employ a rotary encoder, the tap may be axially advanced accurately in accordance with the pitch thereof as it is rotated, thereby cutting screw threads in the workpieces with high accuracy.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
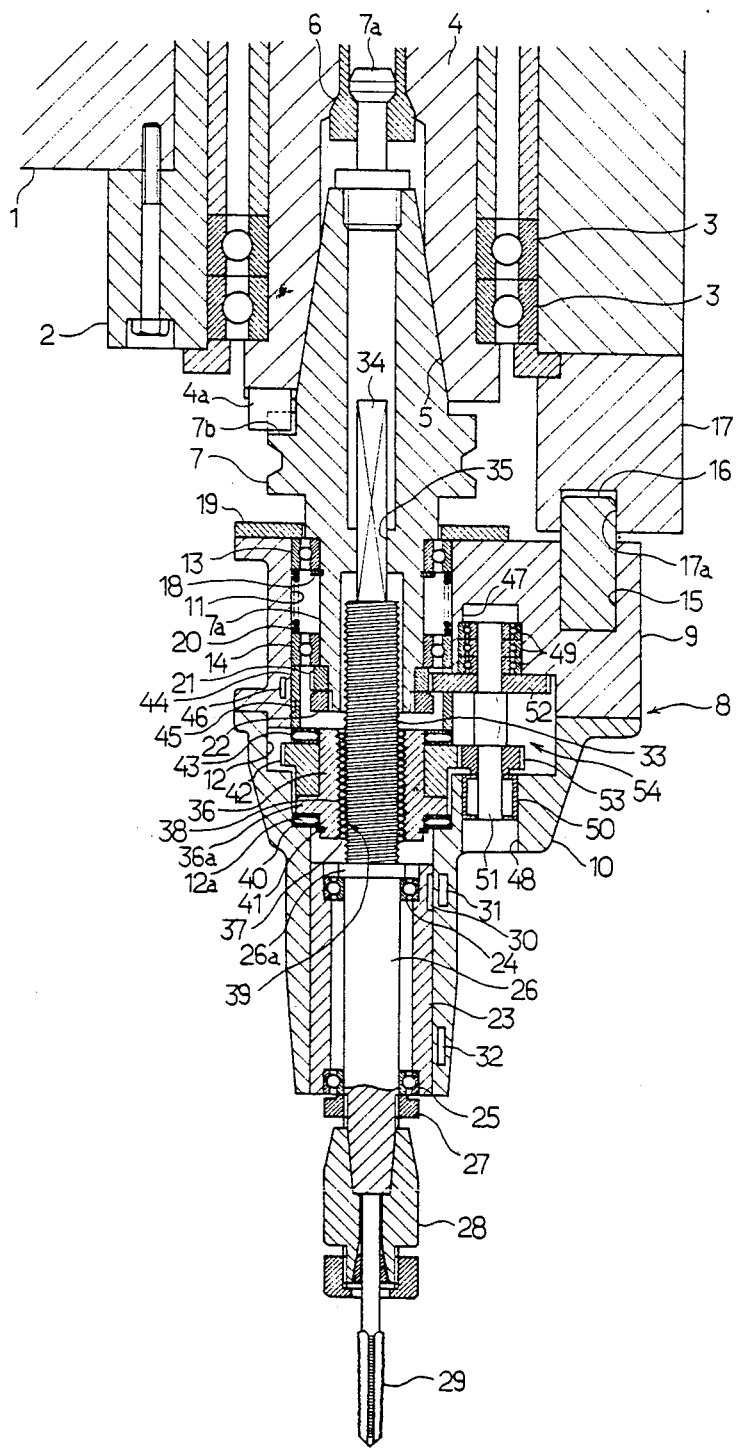
FIG. 1 is a longitudinal section of the tapping apparatus of a first embodiment mounted on the machine head of a machining center.
Figure 2:
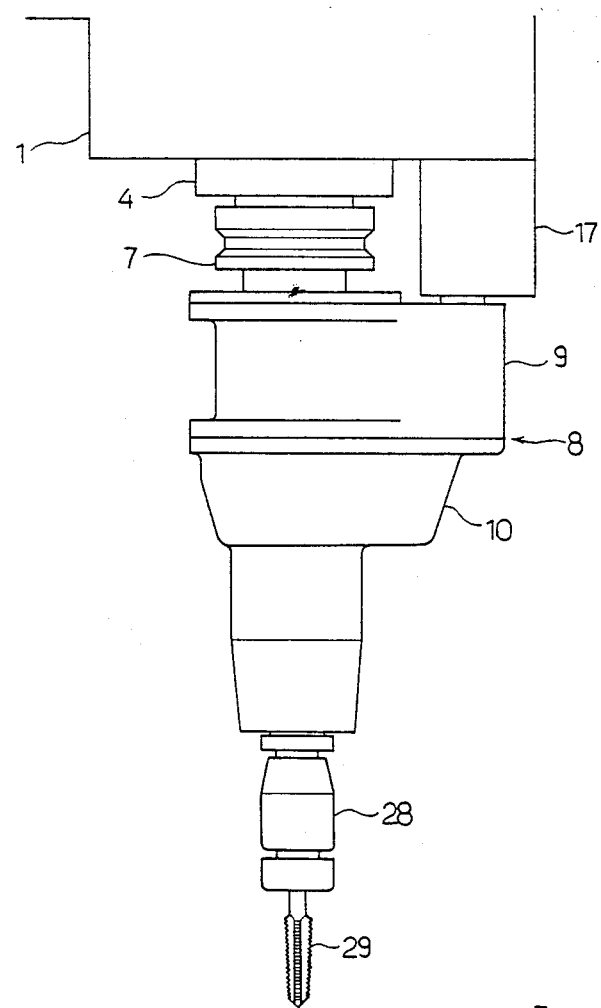
FIG. 2 is a side view of the tapping apparatus in FIG. 1.
Figure 3:
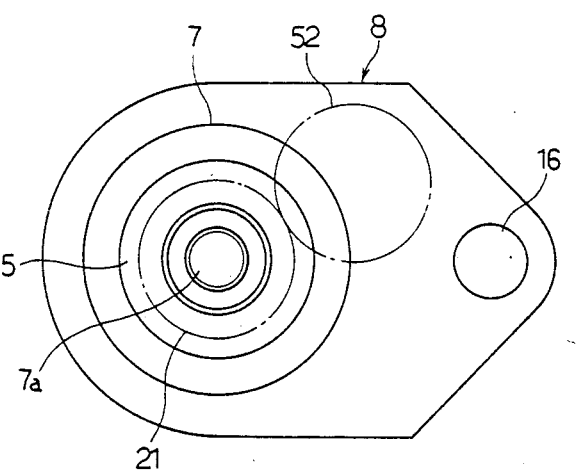
FIG. 3 is a plan view of the tapping apparatus.

Several embodiments of the present invention will now be described with reference to the drawings. Referring first to FIGS. 1-3 illustrating a first embodiment, reference numeral 1 indicates a machine head of a machining center. A cylindrical main shaft 4 is rotatably mounted on a ball bearing 3 secured to a support 2 so as to be rotated by a drive source. The main shaft 4 has a tapered portion 5 formed on the lower end inner periphery. A chuck means 6 is disposed on the inner periphery of the main shaft 4. A drive 7 is detachably fitted in the tapered portion 5 of the main shaft 4 and a cylindrical chuck support 7a thereof is received by the chuck means 6. A concave portion 4a formed in the lower end of the main shaft 4 is fitted in a convex portion 7b formed in the middle outer periphery of the drive 7 so that rotation of the main shaft 4 is transmitted to the driver 7. A frame 8 is made up of aluminum upper and lower frame sections 9 and 10 connected to each other with bolts or the like (not shown). Longitudinal holes 11 and 12 are formed so as to vertically extend over the upper and lower frame sections 9 and 10, respectively. The chuck support 7a formed integrally with the driver 7 is projected from the lower end thereof and inserted in the longitudinal hole 11 through ball bearings 13 and 14. Accordingly, the drive 7 is rotatably mounted on the frame 8. A recessed portion 15 is formed on the upper surface of the upper frame section 9 with a predetermined distance from the longitudinal hole 11. A shaft 16 is inserted in the recessed portion 15. The shaft 16 is further detachably inserted in a recess 17a formed in a support block 17 serving as a stationary portion fixed to the underside of the support 2, thereby preventing rotation of the frame 8. A stop ring 18 prevents an inner race of the ball bearing 13 from axially moving relative to the chuck support 7a of the driver 7. An end plate 19 prevents an outer race of the ball bearing 13 from being displaced upwardly. An inner race of the ball bearing 14 is allowed to be axially moved relative to the chuck support 7a of the driver 7 and an outer race thereof is allowed to be slidably moved relative to the longitudinal hole 11 of the upper frame 9. A compression coil spring 20 is provided between the outer races of the ball bearings 13 and 14. A drive gear 21 is secured on the lower end of the chuck support 7a of the driver 7 with a nut 22. The drive gear 21 prevents the inner race of the ball bearing 14 from being moved downwardly.

A cylindrical member 23 is mounted on the lower inner periphery of the longitudinal hole 12 formed in the lower frame section 10 so as to be vertically slidable. A spindle 26 is rotatably supported by ball bearings 24 and 25 both mounted on the inner periphery of the cylindrical member 23. A flange 26a of the spindle 26 is engaged with an inner race of the ball bearing 24 and a nut 27 threadably engaged with the lower end of the spindle 26 is engaged with an inner race of the ball bearing 26, whereby the spindle 25 is vertically moved with the cylindrical member 23. Another chuck means 28 is secured to the lower end of the spindle 26. A tape 29 is to be attached to the chuck means 28.

A magnetic substance 30 is embedded in the upper periphery of the cylindrical member 23. Magnetic sensors 31 and 32 are embedded within the lower frame 10 with a predetermined vertical interval therebetween and are opposed to the magnetic substance 30. An external thread section 33 with a pitch of 1 mm, for example, is formed on the middle outer periphery of the spindle 26. The spindle 26 has a coupling section 34 projected from the upper end of the external thread section 33. The coupling section 34 has a rectangular sectional shape and is slidably inserted in a coupling hole 35 formed in the driver 7. A cylindrical guide member 35 is rotatably disposed in the longitudinal hole 12 so as to be positioned around the outer periphery of the external thread section 33 of the spindle 26. The guide member 36 is provided with an internal thread section 37 formed in the inner periphery of the guide member 36 and having the same pitch as that of the external thread section 33. A plurality of metallic ball members 38 are provided between the external and internal thread sectional 33 and 37. The ball members 38 engage both of the external and internal thread sections 33 and 37 and rolls so as to be circulated through a guide passageway (not shown). The external and internal thread section 33 and 37 and the ball members 38 constitute a so-called ball screw mechanism 39. A thrust bearing 40 is provided between the lower face of the outer peripheral flange 36a of the guide member 36 and an intermediate stepped portion 12a of the longitudinal hole 12. A stop ring 41 is provided so that the thrust bearing 40 is prevented from falling down. A follower gear 42 is secured to the outer periphery of the guide member 36 so as to be engaged with the upper face of the flange 36a. A thrust bearing 43 is provided on the upper face of the follower gear 42. A cylindrical member 44 is disposed in the longitudinal hole 11 for slidable movement. The lower end of the cylindrical member 44 is engaged with the thrust bearing 43 and the upper end of the cylindrical member 44 is engaged with the outer race of the ball bearing 13. A magnetic substance 45 is embedded in the outer periphery of the cylindrical member 44. A magnetic sensor 45 is embedded within the upper frame 9 so as to be positioned with a predetermined interval over the magnetic substance 45.

The frame 8 has other longitudinal holes 47 and 48 formed in the parallel with the holes 11 and 12. Each of the holes 47 and 48 has several stepped portions formed inside thereof. A part of each of the holes 47 and 48 communications to the longitudinal holes 11 and 12. Both of the longitudinal holes 47 and 48 extend through the upper and lower frame sections 9 and 10. A shaft 51 is rotatably mounted on three ball bearings 49 and a roller bearing 50 disposed in the longitudinal holes 47 and 48. A spur gear 52 secured to the upper end of the shaft 51 is in a mesh engagement with the driving gear 21. A pinion gear 53 provided on the lower end of the shaft 51 integrally therewith is in a mesh engagement with the follower gear 42. A gearing mechanism including the driving gear 21, spur gear 52, shaft 51, pinion gear 53, and follower gear 52 constitutes a synchronous rotation mechanism 54 which will hereinafter be described. Where the tap 29 has a pitch of 0.5 mm, the driving gear 21 and spur gear 52 are set in the transmission gear ratio of 1:1, and the pinion gear 53 and follower gear 42 are set in the transmission gear ratio of 2:1.

Operation of the tapping apparatus of this invention will now be described. When the main shaft 4 is forward rotated, the driver 7 is forward rotated therewith. The spindle 26 is forward rotated at the same speed as that of the driver 7. Simultaneously, since rotation of the driver 7 is transmitted to the guide member 36 by way of the synchronous rotation mechanism 54, the guide member 36 is rotatably driven in the same direction as the spindle 26 at a half of the rotational speed of the spindle 26. When the spindle 26 is forward rotated, the external thread section 33 is threadably engaged with the internal thread section 37, whereby the spindle 26 is advanced, rotating. Since the guide member 36 is rotated in the same direction as the spindle 26 at half of the rotational speed of the same, when the spindle 26 is rotated by one revolution, the spindle 26 is advanced by a distance of 0.5 times the pitch of external and internal thread sections 33 and 37, that is, by a distance of 0.5 mm while the same is rotated by one revolution. The advanced distance of the spindle 26 agrees with the pitch of the tap 29. With advancement of the spindle 26, the tap 29 is threadedly inserted into a prepared hole formed in a workpiece placed on a worktable (not shown), thereby performing the screw cutting. Subsequently, when the screw cutting is completed with the cylindrical member 23 travelling by a predetermined distance in accordance with the rotation of the spindle 26, the spindle 26 and cylindrical member 23 are further advanced to reach a position where the magnetic substance 30 is opposed to the magnetic sensor 32. A detection signal is generated by the magnetic sensor 32. In response to the detection signal from the magnetic sensor 32, the driver 7 is then reverse rotated. Upon reverse rotation of the driver 7, the spindle 25 is reverse rotated and retracted. As a result, the tap 29 is withdrawn from the threaded screw hole. It is needless to say that the spindle 26 is retracted by a distance of 0.5 mm while the same is rotated one revolution and that the retractive movement agrees with the pitch of the tap 29. When the spindle 26 is retracted to an initial position shown in FIG. 1, the magnetic substance 30 is opposed to the magnetic sensor 31, which generates a detection signal. In response to the detection signal delivered from the magnetic sensor 31, the rotation of the main shaft 4 is stopped.

Now, assume a case where when the spindle 26 and tap 29 are advanced, forward rotating, the tap 29 collides with a portion of the workpiece other than the prepared hole owing to failure in positioning the workpiece on the worktable. Since the spindle 26 is prevented from being further advanced, a force acts on the guide member 36, which is moved upwardly. Since a spring force of the compression coil spring 20 is usually exterted on the guide member 36 through the outer race of the ball bearing 14, cylindrical member 44, and thrust bearing 43, the guide member 36 is adapted not to be suddenly retracted in the normal screw cutting operation. However, when an upward force acts on the guide member 36 with the spindle 26 prevented from being advanced, the guide member 36, thrust bearing 43, cylindrical member 44, and ball bearing 14 are retracted against the compression coil spring 20. When the cylindrical member 44 is retracted by a predetermined distance, the magnetic substance 45 is positioned opposite to the magnetic sensor 46, which generates a detection signal. In response to the detection signal delivered from the magnetic sensor 46, the driver 7 is reverse rotated, whereby the spindle 26 is reverse rotated. The spindle 265 is then retracted and the tap 29 is withdrawn from the workpiece. When the spindle 26 is retracted to reach the initial position shown in FIG. 1, rotation of the spindle 26 is stopped. Thus, the tap 29 may be prevented from being suffered from an undesirable force.

According to the above-described construction, a screw cutting unit is mounted on the main shaft 4. The internal thread section 37 is formed in the inner periphery of the guide member 36. The external thread section 33 is formed in the outer periphery of the spindle 26 which is rotated in the same direction as the driver 7 driven by the main shaft 4. The external thread section 33 is threadably engaged with the internal thread section 37. Rotation of the driver 7 is transmitted with a predetermined ratio to the guide member 36 through the synchronous rotation mechanism 54, thereby rotating the guiding member 36 in the same direction as the spindle 26. Although the tapping apparatus in accordance with this invention thus has a simple construction, the tap 29 may be advanced with accuracy in accordance with the rotation thereof. Consequently, even when the workpiece has a small thickness, the screw holes may be cut with high accuracy.

In the above-described construction, the axial feed pitch of the spindle 25 per one revolution thereof may be set at a value smaller than the pitch of the external and internal thread sections 33 and 37 of the ball screw mechanism 39. Additionally, the axial feed pitch of the spindle 26 may be set at any value by changing the transmission ratio of the synchronous rotation mechanism 54. Consequently, the spindle 26 may have different feed pitches in accordance with the pitches of the tap 29 even where the pitch of the external and internal thread sections 33 and 37 of the ball screw mechanism 39 takes only one value. A plurality of tapping units corresponding to taps having different pitches may be employed by changing the transmission ratio of the synchronous rotation mechanism 54 with a single ball screw mechanism 39 used in common. Accordingly, more parts may be commonly used than the case where ball screws having different pitches in accordance with the pitches of the taps are produced, thereby reducing the production cost of the tapping apparatus.

Furthermore, since there is no need to axially displace the main shaft 4, the tapping apparatus of this invention may be applied to a machining center not equipped with a rotary encoder which detects rotation of the main shaft 4 to thereby move the machine head, whereby screw holes may easily be formed in the workpieces with high accuracy even where the machining center is not equipped with a rotary encoder. Furthermore, since the upper and lower positions of the spindle 26 are sensed by means of the magnetic substance 30 and the magnetic sensors 31 and 32 to thereby control the forward and reverse rotations of the main shaft 4, the tapping apparatus of this invention may be applied to the machining centers which do no incorporate means for detecting rotation of the main shaft 4.

Although the ball screw mechanism 39 is provided between the external and internal thread sections 33 and 37, the balls being interposed between the external and internal thread sections, the external thread section 33 of the spindle 26 may directly be threadedly engaged with the internal thread section 37 of the guide member 36. In the case that the external thread section 33 is threadedly engaged with the internal thread section 37 directly, the wear rate of these sections is increased when the pitch of the sections takes a small value, thereby shortening the life of these parts. However, the pitch of the external and internal thread sections 33 and 37 may be set at any value larger than the pitch of the tap 29 in the embodiment, thereby reducing the wear rate and securing long life of these parts.

Furthermore, although the driver 7 is driven by the main shaft 4 of the machining center in the foregoing embodiment, the driver 7 may directly be driven by a suitable motor.

Figure 4:
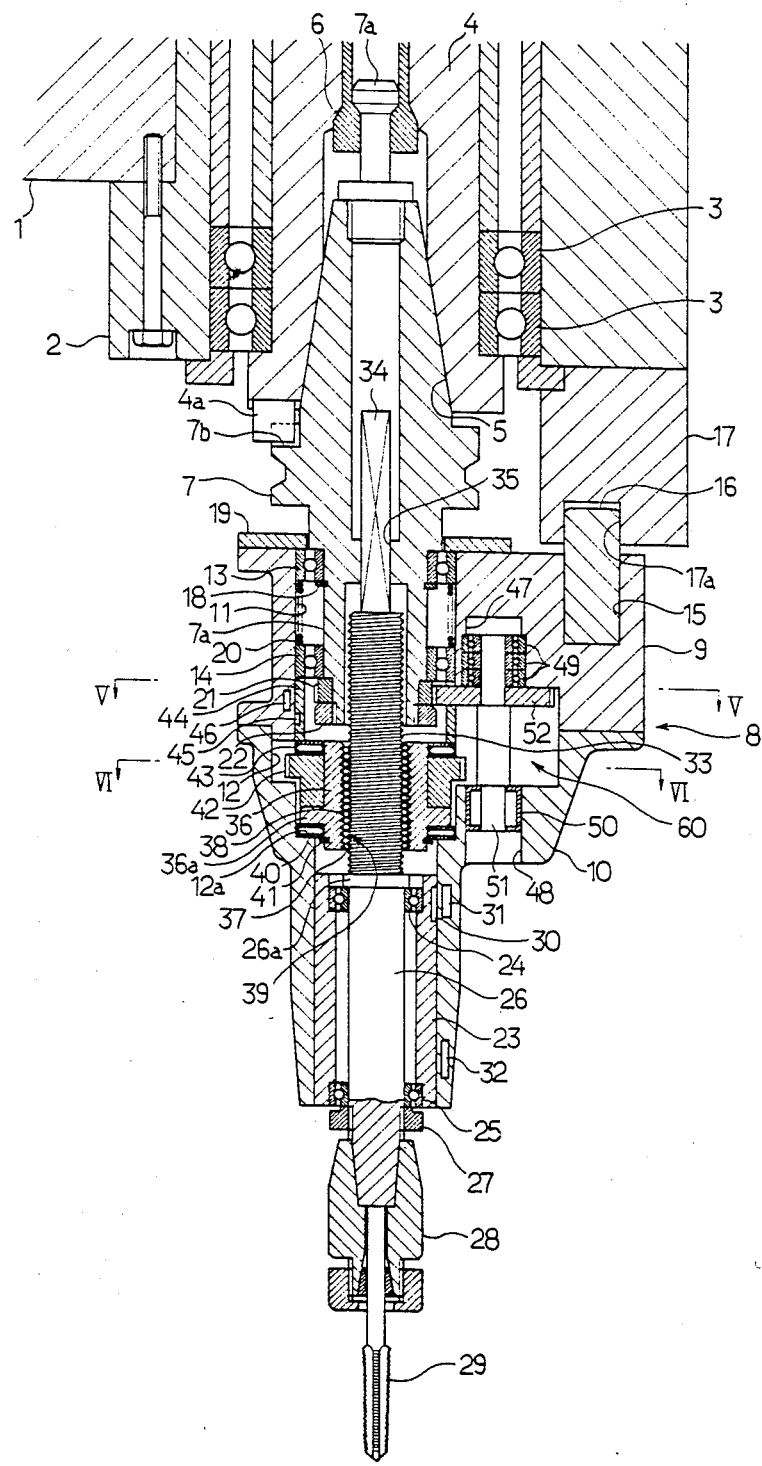
FIG. 4 is a longitudinal section of the tapping apparatus of a second embodiment of the present invention.
Figure 5:
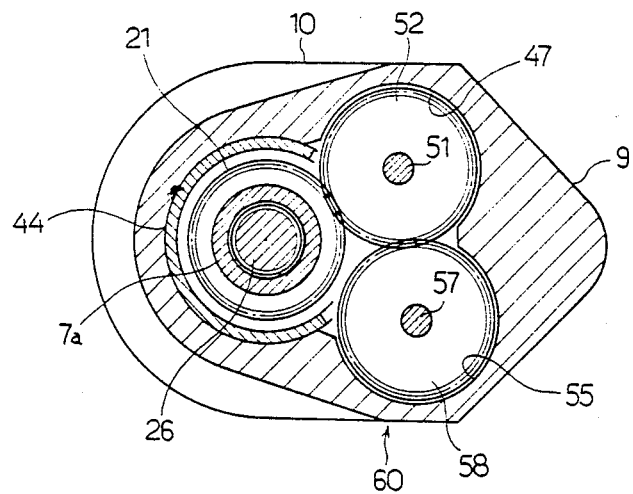
FIG. 5 is a section view taken along line V—V in FIG. 4.
Figure 6:
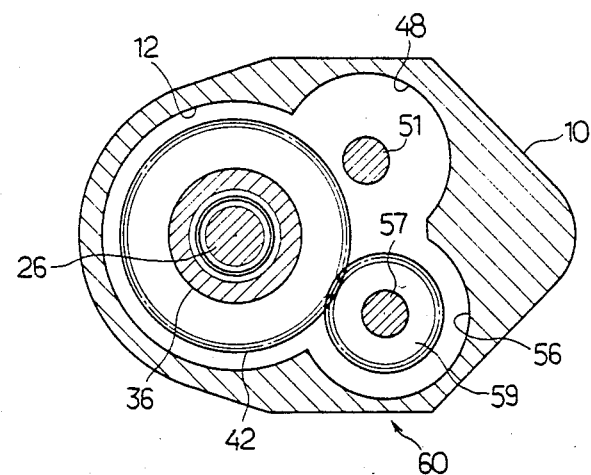
FIG. 6 is a sectional view taken along line VI—VI in FIG. 4.

A second embodiment of the present invention will now be described with reference to FIGS. 4–6. Identical parts are labelled by the same reference numerals as in the first embodiment and the differences between the first and second embodiments will be described. Although the shaft 51 is provided with the spur gear 52 which is in mesh engagement with the driving gear 21, the pinion gear 53 is eliminated in the second embodiment. Longitudinal holes 55 and 56 are formed in the frame 8 so as to extend through the upper and lower frame sections 9 and 10. The longitudinal holes 55 and 56 are parallel with the holes 11 and 12 and a part of each of the holes 55 and 56 communicates to the longitudinal holes 11, 12 and 47, 48. Each of the longitudinal holes 55 and 56 has a stepped configuration. The shaft 57 is rotatably supported by the ball bearing and roller bearing (neither shown) within the longitudinal holes 55 and 56. An intermediate gear 58 secured to the shaft 47 is in mesh engagement with the spur gear 52, as shown in FIG. 5. A pinion gear 59 integrally provided on the lower end of the shaft 57 is in mesh engagement with the follower gear 42, as shown in FIG. 6. The transmission mechanism comprising the driving gear 21, spur gear 52, shaft 51, intermediate gear 58, shaft 57, and pinion gear 59 serves as the synchronous rotation mechanism 60. Where the pitch of the tap 29 is 0.5 mm, the section from the driving gear 21 through the spur gear 52 to the intermediate gear 58 is in the transmission ratio of 1:1, and the pinion gear 59 and follower gear 42 are in the transmission ratio of 2:1.

In the operation of the tapping apparatus of the second embodiment, the driver 7 is forward rotated with forward rotation of the main shaft 4. Further, the spindle 26 is forward rotated at the same speed as that of the driver 7. Simultaneously, rotation of the driver 7 is transmitted to the guide member 36 through the synchronous rotation mechanism 60, whereby the guide member 36 is rotated in the opposite direction to the spindle 26 at a half speed of the same. When the spindle 26 is forward rotated, the external thread section 33 is threadably engaged with the internal thread section 37, whereby the spindle 26 is advanced, rotating. Since the guide member 36 is rotated a half revolution while the spindle 26 is rotated one revolution, the relative rotation of the spindle 26 to the guide member 36 is 1.5 revolutions per one revolution thereof. Accordingly, while rotated one revolution, the spindle 26 is advanced by a distance 1.5 times the pitch of the external and internal thread sections 33 and 37, that is, by a distance of 1.5 mm, which value agrees with the pitch of the tap 29. With advancement of the spindle 26, the tap 29 is threadedly inserted into the prepared hole in the workpiece placed on the worktable, thereby performing the screw cutting.

In the second embodiment, the spindle 26 is axially moved in accordance with the pitch of the tap 29 as in the foregoing embodiment. Consequently, the tap 29 is capable of being accurately fed in accordance with the rotation thereof. Therefore, even where the workpiece has a relatively small thickness, screw holes may be formed in the workpieces with high accuracy.

Figure 7:
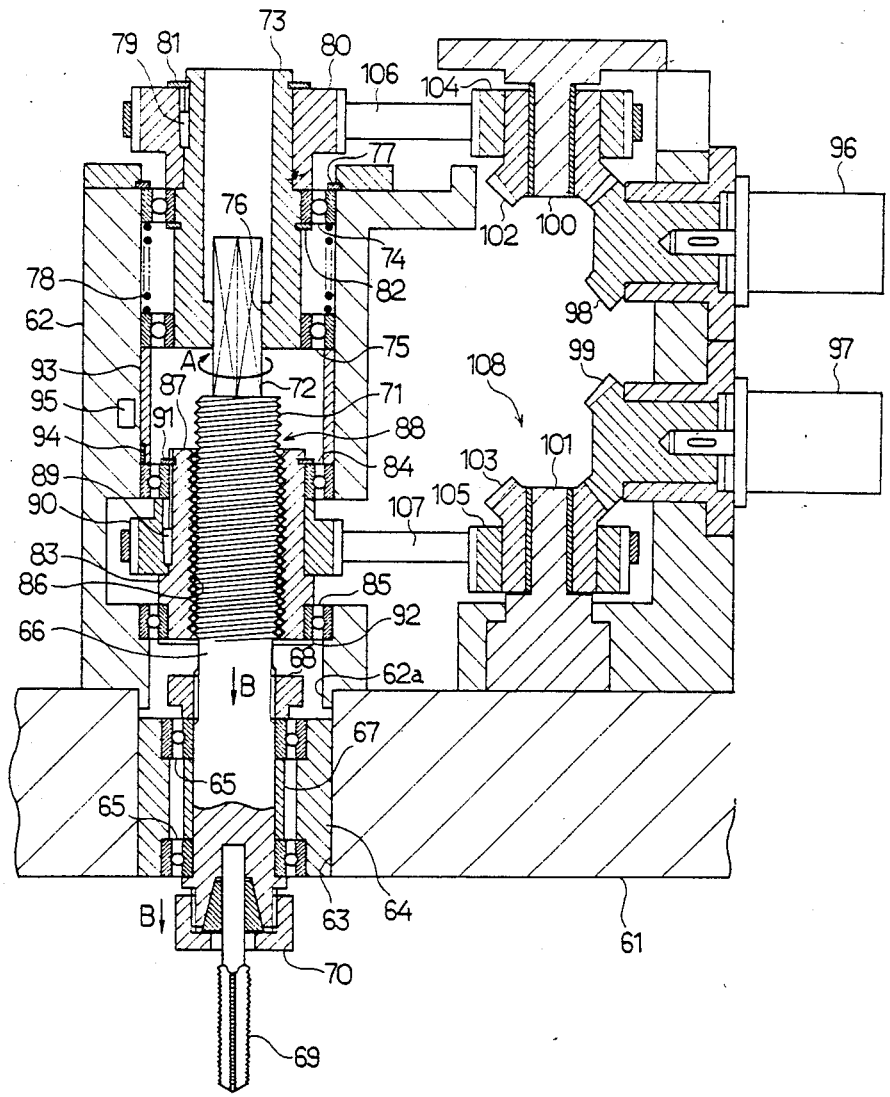
FIG. 7 is a longitudinal section of the tapping apparatus of a third embodiment of the present invention.

FIG. 7 illustrates a third embodiment of this invention. Reference numeral 61 indicates a machine head supporting an upper die of a punching machine, for example. A frame 62 having a longitudinal hole 62a is secured to the machine head 61. The head 61 has a longitudinal hole 63 communicating to the hole 62a. A cylindrical collar 64 is supported in the longitudinal hole 63 for vertical slidable movement. A spindle 66 is rotatably mounted on the collar 64 through ball bearings 65. A collar 67 and nut 68 are employed to secure the ball bearings 65 to the spindle 66. A chuck means 70 mounted on the lower end of the spindle 66 chucks a tap 68. An external thread section 71 having a pitch of 1 mm is formed in the intermediate outer periphery of the spindle 66. The spindle 26 has a coupling section 72 formed on the upper end thereof and having a rectangular cross section. A cylindrical drive shaft 73 is rotatably mounted on the ball bearings 74 and 75 in the upper longitudinal hole 62a. The drive shaft 73 has a rectangular coupling opening 76 at its lower end and the coupling section 72 is slidably inserted in the coupling opening 76. A stop ring 77 prevents the outer race of the upper ball bearing 74 from moving upwardly, while the outer race of the lower ball bearing 75 is allowed to move vertically relative to the longitudinal hole 62a. A compression coil spring 78 is provided between the ball bearings 74 and 75 so that the ball bearing 75 is usually urged downwardly. A timing pulley 80 is secured to the upper end of the drive shaft 73 through a key 79. A stop ring 81 prevents the timing pulley 80 from coming out upwardly. The inner race of the ball bearing 74 is positioned by the timing pulley 80 and stop ring 82 and secured to the outer periphery of the drive shaft 73. A guide member 83 is positioned around the outer periphery of the external thread section 71 and rotatably mounted on ball bearings 84 and 85 in the longitudinal hole 62a. The guide member 83 has an internal thread section 86 formed in the inner periphery thereof. The internal thread section 86 has the same pitch as the external thread section 71. A plurality of metallic ball members 87 are provided between the external and internal thread sections 71 and 86 so as to engage both of them and roll therebetween. The ball members 87 are adapted to circulate through a guide passageway (not shown). The external and internal thread sections 71, 86 and ball members 87 constitute a so-called ball screw mechanism 88. The outer races of the ball bearings 84 and 85 supporting the guide member 83 are axially slidable relative to the longitudinal hole 62a. A timing pulley 90 is secured to the outer periphery of the guide member 83 through a key 89. A stop ring 91 prevents the timing pulley 90 and the inner rance of the ball bearing 84 from coming out upwardly. An end plate 92 prevents the inner race of the ball bearing 85 from coming out downwardly. A cylindrical member 93 is provided in the longitudinal hole 62a for slidable movement. Opposite ends of the cylindrical member 93 are engaged with the outer races of the ball bearings 84 and 75, respectively. A magnetic substance 94 is embedded at a predetermined position within the cylindrical member 93. A magnetic sensor 95 is provided on the frame 62 in cooperative relation to the magnetic substance 94.

Reference numerals 96 and 97 indicate first and second electric motors as drive sources, respectively. Bevel gears 98 and 99 are mounted on the rotational shafts of the motors 96 and 97, respectively. Other bevel gears 102 and 103 are provided on shafts 100 and 101 mounted on the frame 62, respectively. The bevel gears 102 and 103 are rotated in mesh engagement with the bevel gears 98 and 99, respectively. Timing pulley 104 and 105 are mounted on the outer peripheries of the bevel gears 102 and 103, respectively. A timing belt 106 is provided between the timing pulleys 80 and 104, and a timing belt 107 is also provided between the timing pulleys 90 and 105. A pulse motor, servomotor, or computer-controlled motor may be employed as each of the first and second motors. In addition, should the drive sources be controlled so that the rotation of the second drive source agrees with that of the first drive source, means other than an electric motor may be employed as the drive sources. A synchronous rotation mechanism 108 comprises the second motor 97, bevel gears 99 and 103, timing pulleys 90 and 105, and timing belt 107.

Operation of the tapping apparatus of the third embodiment will now be described. A tap 69 having the nominal diameter of 3 mm and the pitch of 0.5 mm is attached to the chuck means 70, for example. When the workpiece is set on the worktable so that a prepared hole formed therein is positioned directly below the tap 69, the first motor 90 is energized to be driven at the speed of r revolutions per second (RPS) in the forward direction. The second motor 97 is energized to be driven at the speed of r/2 RPS in the forward direction in synchronization with the first motor 69. The rotational force of the first motor 69 is transmitted to the drive shaft 73 through the bevel gears 98 and 102, timing pulley 104, timing belt 106, and timing pulley 80, thereby rotating the spindle 66 in the forward direction or in the direction of arrow A at the speed of r RPS. The rotational force of the second motor 97 is transmitted to the guide member 83 through the bevel gears 99 and 103, timing pulley 105, timing belt 107, and timing pulley 90, whereby the guide member 83 is rotated in the forward direction or in the direction of arrow A at the speed of r/2 RPS by means of the synchronous rotation mechanism 108. Accordingly, since while the spindle 66 is rotated one revolution, the guide member 83 is rotated by a half revolution in the same direction as the spindle 66, the spindle 66 is fed in the direction of arrow B by the distance corresponding to half the pitch of the external and internal thread sections 71 and 86 or 0.5 mm, which value is in accordance with the pitch of the tap 69. The tap 69 is thus threadedly inserted into the prepared hole in the workpiece, thereby performing the screw cutting. The ball bearings 65 and collar 64 are slidingly moved in the direction of arrow B relative to the longitudinal hole 63 together with the spindle 66. Since the distance that the spindle 66 is fed can be obtained from the rotational speeds of the first and second motors 96 and 97, the first and second motors 96 and 97 are reverse rotated when the screw cutting operation is completed with the spindle 66 being fed by a predetermined distance, thereby retracting the tap from the screw hole in the workpiece. When the spindle 66 is retracted to the initial position shown in FIG. 7, the first and second motors 96 and 97 are deenergized.

Assume now that the tap 69 moving in the direction of arrow B is locked during the screw cutting operation owing to collision of the tap 69 against the bottom of the prepared hole or for other reasons. In such a case, a reaction force exerts upon the guide member 83, which is moved against the compression coil spring 78 in the direction opposite to arrow B. With such movement of the guide member 83, the cylindrical member 93 is also moved in that direction. When the cylindrical member 93 is moved by a predetermined distance, the magnetic substance 94 is positioned opposite to the magnetic sensor 95, thereby delivering a detection signal from the same. In response to the detection signal from the magnetic sensor 95, the first and second motors 96 and 97 are reverse rotated to thereby retract the spindle 66 from the prepared hole of the workpiece. When the spindle 66 is moved backwardly to the initial position shown in FIG. 7, the first and second motors 95 and 96 are deenergized.

As described above, the second motor 97 is rotatably driven in synchronization with the first motor 96. However, when the pitch of the tap 69 takes a value smaller than the pitch of the external and internal thread sections 71 and 88 of the ball screw mechanism 88, the guide member 83 is driven in the same direction as the spindle 66 at a rotational speed the value of which is smaller than that of the spindle 66. On the other hand, when the pitch of the tap 69 takes a value larger than that of the external and internal thread sections 71 and 86, the guide member 83 is driven at a predetermined rotational speed in the direction opposite to that of the spindle 66. Further, when the pitch of the tap 69 is equal with the pitch of the external and internal thread sections 71 and 86, the second motor 97 is deenergized.

According to the third embodiment, when the rotational speed of the guide member 83 synchronous with the spindle 66 and the direction in which the guide member 83 is advanced are changed, the axial movement of the spindle 26 may agree with the pitch of the tap 69. Accordingly, the spindle 66 and the guide member 83 may be separately driven by the first and second drive sources, respectively, thereby denecessitating the reduction gear mechanism. Further, the gears may not be exchanged for different pitches of the taps 69, thereby simplifying the handling of the apparatus.

Although the frame 62 is mounted on the head 61 of the punching machine in the foregoing embodiment, the frame 62 may be mounted on other equipments. Further, although the screw ball mechanism 88 comprising the external and internal thread sections 71 and 86 and the ball members 87 provided therebetween is employed, the external thread section 71 may directly be engaged with the internal thread section 86. Additionally, the first motor 96 may be coupled directly to the drive shaft 73 or spindle 66 and the second motor 97 is so designed that the guide member 83 constitutes a rotor thereof.

The foregoing disclosure and drawings are merely illustrative of the principles of the present invention and are not to be interpreted in a limiting sense. The only limitation is to be determined from the scope of the appended claims.

What is claimed is:
1. A tapping apparatus comprising:
   (a) a frame;
   (b) a spindle mounted on said frame for rotation and for axial movement, said spindle being provided with a tap coupled to one end thereof, said spindle being driven by a drive source comprising a drive unit coupled to a main shaft of a machine tool and being rotatably mounted on said frame;
   (c) an external thread section formed in the outer periphery of said spindle;
   (d) a guide member having outer and inner peripheries and being rotatably mounted on said frame, said guide member having an internal thread section formed in the inner periphery thereof, the internal thread section being threadably engaged with said external thread section; and
   (e) a synchronous rotation mechanism for driving said guide member, the synchronous rotation mechanism comprising a first rotational member rotatively coupled to a member rotated with the spindle, a second rotational member coupled to the outer periphery of the guide member and rotation transmitting means provided between the first and second rotational members for transmitting rotation of the first rotational member to the guide member through the second rotational member at a predetermined transmission ratio so that the axial movement of said spindle agrees with the pitch of the tap.

2. A tapping apparatus for rotating and reciprocating a tap having a pitch comprising:
   (a) a frame;
   (b) a spindle mounted on the frame for rotation and for reciprocal axial movement, the spindle having an outer periphery and being provided with a tap detachably coupled to one end thereof, the spindle being rotatively driven by a drive source, the spindle having a reciprocal axial movement pitch;
   (c) an external thread section integrally provided on the outer periphery of the spindle;
   (d) a guide member having an inner periphery and a cylindrical portion having an outer periphery, the guide member being rotatably mounted on the frame, the guide member having an internal thread section formed in the inner periphery thereof, the internal thread section being threadedly engaged with the external thread section; and
   (e) a synchronous rotation mechanism for rotatively driving the guide member, the synchronous rotation mechanism comprising a first rotational member rotatively coupled to a member rotated with the spindle, a second rotational member coupled to the outer periphery of the cylindrical portion of the guide member, and rotation transmitting means provided between the first and second rotational members for transmitting rotation of the first rotational member to the guide member through the second rotational member at a predetermined transmission ratio, whereby reciprocal axial movement pitch of the spindle is caused to agree with the pitch of the tap.

3. A tapping apparatus as claimed in claim 2, which further comprises a shaft coupled to the first and second rotational members so that the first and second rotational members are simultaneously rotated, whereby the guide member is rotated in the same direction that the spindle is rotated.

4. A tapping apparatus as claimed in claim 2, wherein said rotation transmitting means of the synchronous rotation mechanism includes a gear operatively coupled to the first and second rotational members so that the second rotational member is rotated in the direction opposite to that of the first rotational member, whereby the guide member is rotated in the direction opposite to that of the spindle.

5. A tapping apparatus as claimed in claim 2, wherein a plurality of metallic ball members are interposed between the external and internal thread sections.

6. A tapping apparatus comprising:
(a) a frame; (b) a spindle mounted on the frame for rotation and for axial movement, the spindle being provided with a tap detachably coupled to one end thereof, the tap being provided with a pitch and the spindle being rotatively driven by a drive source;
(c) an external thread section integrally provided on the outer periphery of the spindle;
(d) a guide member having an inner periphery rotatably mounted on the frame and having an internal thread section formed in the inner periphery thereof, the internal thread section being threadably engaged with the external thread section;
(e) a first electric motor coupled to the spindle through rotation transmitting means so that the spindle is rotated; and
(f) a second electric motor coupled to the guide member through rotation transmitting means so that the guide member is rotated, the difference between the rotational speeds of the first and second electric motors being so determined that the axial movement pitch of the spindle is caused to agree with the pitch of the tap.

* * * * *